United States Patent [19]
Sawyer et al.

[11] Patent Number: 5,548,818
[45] Date of Patent: Aug. 20, 1996

[54] NETWORK ACQUISITION MECHANISM FOR MOBILE RF DATA

[75] Inventors: James G. Sawyer; Bruce S. Kloster; Ralph L. Kitson, all of Cedar Rapids; Randall M. Kovatch, Marion; Daniel C. Roepke; M. Frank Wilson, both of Cedar Rapids, all of Iowa

[73] Assignee: Rockwell International, Seal Beach, Calif.

[21] Appl. No.: 934,980

[22] Filed: Aug. 25, 1992

[51] Int. Cl.⁶ .................................................. H04B 1/00
[52] U.S. Cl. .................. 455/54.1; 455/33.1; 455/33.4; 455/56.1; 455/67.1; 455/34.2; 379/59
[58] Field of Search .................................. 455/33.2, 33.4, 455/34.2, 33.1, 32.1, 53.1, 54.1, 54.2, 56.1, 67.1, 67.4, 68, 161.1, 161.3, 168.1; 379/58, 59

[56] References Cited

U.S. PATENT DOCUMENTS 4,876,738  10/1989  Selby ........................................ 455/54.1
4,903,320   2/1990  Hanawa ................................... 455/34.2
5,150,362   9/1992  Akerberg ............................... 455/33.1
5,179,374   1/1993  Winger ................................... 455/33.1
5,224,152   6/1993  Harte ......................................... 379/59
5,237,321   8/1993  Oliwa ..................................... 455/32.1
5,257,400  10/1993  Yoshida ................................. 455/54.2
5,373,548  12/1994  McCarthy .............................. 455/33.1
5,375,254  12/1994  Owen ..................................... 455/54.1

Primary Examiner—Reinhard J. Eisenzopf
Assistant Examiner—Doris To
Attorney, Agent, or Firm—Gregory G. Williams; M. Lee Murrah; George A. Montanye

[57] ABSTRACT

A method and system for radio communications between mobile units and base stations geographically distributed through a substantial geographic area described. The system automatically finds and engages broadcast frequency for each geographic region. The engagement is confirmed at both the mobile unit and network so that both can begin data transmission and reception between each other as well as keep track of the status of one another. The system also verifies the correct base station has been engaged as well as automatically terminates communications once the mobile unit passes out of coverage for that base station.

2 Claims, 6 Drawing Sheets

NETWORK ACQUISITION MECHANISM FOR MOBILE RF DATA

BACKGROUND OF THE INVENTION a. Field of the Invention

The present invention relates to radio frequency (RF) communications systems, and in particular, to relatively large geographical area multifrequency communications networks for communication between mobile units and base stations.

b. Problems in the Art

Mobile RF data communication systems provide data communications in areas and at times when data communications might otherwise be impossible. Mobile RF data communication systems for surface transportation vehicles such as trains, for example, can provide equipment monitoring functions, freight monitoring functions and routing information exchange while the train is in motion. This is, of course, possible only with wireless communication, and this sort of communication provides continuous updating of such information, for example, as temperature, pressure and fuel levels of the train engine, maintenance information, and time for overhaul of the engine.

Freight monitoring functions can provide such information as temperature within refrigerated cars and location of freight contained within the train. This location information is important not only for inventory control, but also as a means for improving transportation efficiency.

RF data communication systems can also provide routing information. For example, the train can indicate which track it is on, as well as where on that track and in what direction it is going. In response, an office dispatch system connected to a network can reroute the train if there is a problem ahead using data communication via an RF base station. Alternatively, it may indicate to the train engineer to adjust speed for conditions ahead. It could also monitor and keep records of track use and train travel.

Other ground transportation systems, for example truck transportation systems, could also benefit from an RF data communication system. Again, the equipment monitoring, freight monitoring and routing information functions would improve efficiency, speed delivery, ensure better inventory control and reduce down time for the truck.

Mobile RF data communication systems for automobiles could also provide such things as rerouting information if for instance there is a detour on the road ahead or if traffic is especially heavy. Additionally, the system could be used to transmit updated information that works in conjunction with an onboard computer and satellite positioning systems to provide drivers with exact information about their location with respect to an onboard map. The map could be updated by the RF data communication system.

RF data communications networks could be advantageously employed in a similar advantageous manner for other situations. Any arrangement having mobile units through a geographic area of substantial size could benefit from the ability to communicate in a wireless manner.

A major impediment to implementation of a wide area, such as nationwide, RF data communication system is the fact that frequencies for such communication systems are allocated by the Federal Communication Commission (FCC) on a regional basis. It is therefore virtually impossible, for example, for a single network to acquire one frequency allocation which provides nationwide coverage. An exception to this general rule is the cellular phone system.

Cellular phone systems benefit from consistent nationwide frequency allocations by the FCC. Specific signal and voice channel assignments accommodate two phone systems in any area. Each cell within the local cellular service area is assigned one signal channel and multiple voice channels from a predetermined frequency allocation. Calls are initiated on the signal channel and the voice conversation occurs on a voice channel which will change from time to time as the vehicle moves from cell to cell during the phone call.

Cellular phone systems rely heavily on RF signal strength information in order to support the operation of the system, particularly the voice channel switching logic. This requirement, to precisely measure RF signal strength and to discriminate among several potential control actions based on the magnitude and difference in magnitude of this measurement, requires specialized equipment and control logic at both the base station and mobile device. Cellular systems also use this specialized equipment to measure signal strength in conjunction with the signal channel scan cycle. That is, while a mobile unit travels within a cellular phone service area, the mobile unit scans received RF signals and determines the proper RF frequency for the signal channel based upon the signal strength of the received RF signal. All such frequencies scanned are valid for cellular phone service nationwide.

The channel scan logic of the present invention does not require signal strength information, but rather, relies on the quality and reliability of data communications which, in the mobile environment at certain speeds and frequencies, has been shown to be only loosely correlated to signal strength leaving signal strength an unattractive criterion for frequency selection in the present invention.

Since one can not usually obtain licenses for a single frequency that covers the entire nation or other relatively large geographic area, networks must be composed of a patchwork of frequencies that, in composite, attempts to substantially blanket the entire nation or any geographical area of required coverage. Frequencies that may be valid for a mobile unit in one part of the network may be invalid for that mobile in another part of the network.

Even with a system such as this, there is a possibility that some areas will not be covered. It may be either by design, nature of terrain, equipment failure, down time for repair, or other reasons that some areas will not be covered. Further, there are some areas where coverage from more than one frequency might overlap and, due to the nature of RF communications at the boundaries of coverage, there may be areas of intermittent coverage.

It is therefore an object of the present invention to provide an improved system for combining regions of various frequency coverage into a national, or large geographic area, RF data communication network for transportation systems. The network acquisition mechanism is a key element for such a system and is the subject of the present invention. The network acquisition mechanism must provide a means for detecting when a mobile unit is in an area of coverage. It must discriminate between network and non-network communications, and may have to deal with areas in which one of several frequencies is the network frequency in that area. It must identify particular networks in areas where multiple networks share a frequency. It must also provide a means for determining when a mobile unit leaves an area of coverage and must also provide a relatively simple, inexpensive RF data system which can accommodate areas of overlapping coverage, areas of intermittent coverage, and a variety of frequencies assigned to the network on a regional basis.

Such a system must effectively function across a patchwork of frequency coverages. The FCC is very strict about maintaining the sanctity of those frequency assignments for certain areas. To do otherwise would make communication by these networks impossible and render their frequency licenses valueless. In order to comply with regional frequency assignments, truck drivers or cab drivers operating within large geographical areas, for example, may carry frequency coverage maps and compare those maps to their own location in order to determine what frequency to communicate on. Operators are strictly forbidden from transmitting on a frequency other than the one assigned to them in a particular area. A mobile operator cannot therefore use a hit and miss approach; transmitting on a frequency to see if it is the right one for the area, then transmitting on another, and so on, until he finds the proper frequency. Such a scheme would render larger areas of coverage useless due to the heavy traffic associated with operators searching for their assigned frequency. Another object of the present invention is, therefore, to eliminate the need for operator action in accessing an RF network and eliminating the need for on-board maps and geographical database.

These and other objects, features, and advantages of the present invention will become more apparent with reference to the accompanying specification and claims.

SUMMARY OF THE INVENTION

The network acquisition system of the present invention works in the context of an RF data communication system for overland transportation vehicles composed of regional RF base stations which are in contact with mobile RF equipment in the vehicles. The regional base stations are spread throughout a relatively large geographic area with the network having various frequencies assigned to different coverage regions throughout the complete network. The mobile units travel from region to region and may have onboard terminals and monitors which store information, such as with trains, for example, what particular pieces of freight are on board each car; temperature inside cars with temperature sensitive freight; status information regarding the engine; and when previous maintenance took place and when maintenance is due again. The system can be applied to data communications for other types of vehicles and other types of information.

A mobile unit engages the network as follows. The regional base stations transmit network beacon messages on a recurring, time-intervaled basis. Each beacon includes identifying information, for example, a pre-key synchronizing pattern followed by a packet of data which provides the identity of the network associated with that beacon. The beacon is transmitted at a slower repetition when communications are in process to minimize interference with data communications.

The mobile units, when out of coverage, scan frequencies whose values are stored, for example, in a lookup table for beacons associated with their particular networks. The mobile units scan the frequencies in the table and loop around to the first frequency in the table when no beacon has been received.

When the mobile unit receives a transmission, it examines a received packet of information contained in the transmission to determine if the packet is that of a beacon. If it is that of a beacon, it determines whether that beacon is associated with the mobile unit's network.

If the beacon is not associated with the mobile unit's network, the mobile unit will again scan through the frequencies located in its lookup table. If, on the other hand, the beacon corresponds to the proper network, the mobile unit verifies that it is clearly within the coverage area or region for that frequency. One such way is for the mobile unit to count the number of packets received from the base station until the number reaches a threshold level. By waiting until this threshold is exceeded, the mobile assures that coverage is more than intermittent.

After the threshold level has been reached, the mobile can optionally transmit a salutation message to the base station. In response, the network can transmit a confirmation message to the mobile unit and place the mobile unit's identification in memory, such as in a table.

After confirmation from the network, the mobile unit notifies any onboard terminal(s) that it/they are in coverage and may communicate with the network.

The mobile unit can also automatically disengage from communication on a certain frequency of a region if the mobile unit leaves the region. The mobile unit can, for example, set a beacon timer. When the beacon timer times out without receiving any beacon on the particular frequency, it is interpreted by the mobile unit as an indication that the mobile unit is now out of coverage. When the mobile unit determines that it is out of coverage, it indicates this information to the terminal(s) and the terminal(s) can store information which it (they) would otherwise transmit to the network. Likewise, the network could optionally, when it reaches a time threshold without transmission from the mobile unit, recognize the mobile unit is no longer in coverage and remove the mobile unit's identification from an in-coverage table.

The present invention therefore provides a means and method for RF data communication between a plurality of mobile units and a network that can be spread across large geographic areas, even though regions of the large area normally will have different communication frequencies. The invention allows automatic engagement and disengagement for each mobile unit for each region. Options and features allow flexibility and adaptability for different uses and applications. The invention can be applied, for example, to a ground transportation system such as railroad or trucking system. Other applications and uses are possible.

DETAILED DESCRIPTION OF THE PREFERRED EMBODIMENT

Figure 1:
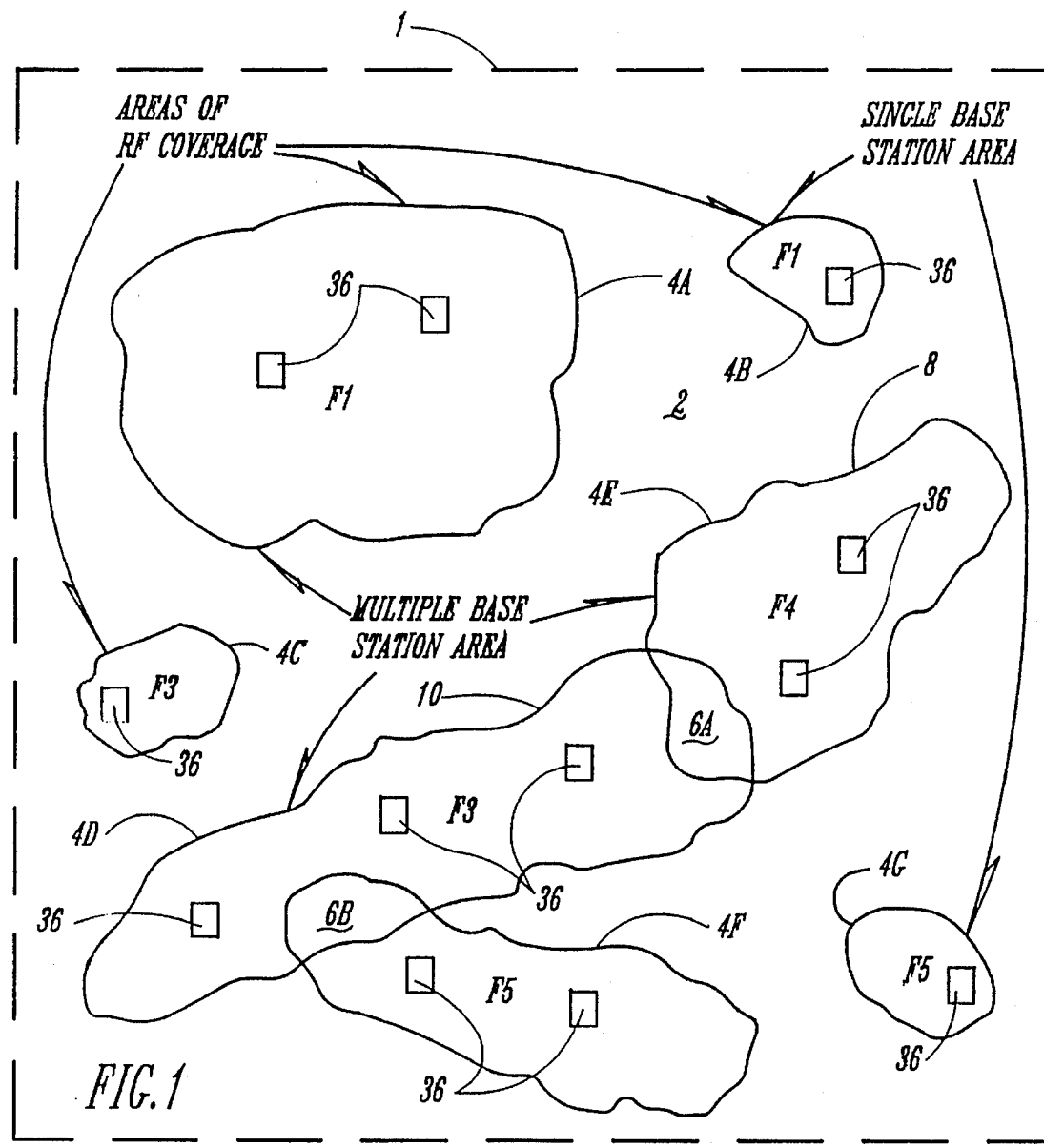
FIG. 1 is a diagrammatical view of the distribution of frequency coverages in a typical multifrequency RF communication network configuration according to the present invention.

To assist in a better understanding of the present invention, a specific embodiment of the invention will now be set forth in detail. This description is not inclusive of all forms the invention can take but is illustrative only.

The drawings will be used throughout this description. Reference characters, including numbers, letters, and combinations of the same, are used to indicate specific parts or locations in the drawings. The same reference characters will be used for the same parts and locations throughout all the drawings, unless otherwise indicated.

This detailed example will be made with respect to a railroad transportation system consisting of a number of different trains traveling on a number of different tracks throughout a large section of the United States. Other uses or implementations of the invention will not be described in detail, but this description can be used by analogy to understand its use for other implementations.

A general overview of the RF communication network will first be given. A more detailed discussion of the specific circuitry and control logic for the preferred embodiment and its operation will then follow.

a. General Overview

FIG. 1 illustrates a hypothetical large geographical area 1 (for example, the United States of America) throughout which is a distribution of smaller regions or areas 4A–4G, throughout each of which RF communication over a designated frequency is allowed. There are also regions or areas 2 within area 1 having no RF coverage. Areas 4A–4G have single frequency coverage. Areas 6A and 6B have multiple frequency coverage or overlap.

Each region 4A–4G includes one or more base stations 36. As can be seen by referring to FIG. 2, each base station 36 contains an RF data transmitter/receiver function 38 as well as other circuitry and control logic 39, such as will be described later.

Each of the plurality of base stations 36 in turn can communicate via a variety of means (land line, microwave, etc.) with what will be called a data switching network 41.

Figure 2:
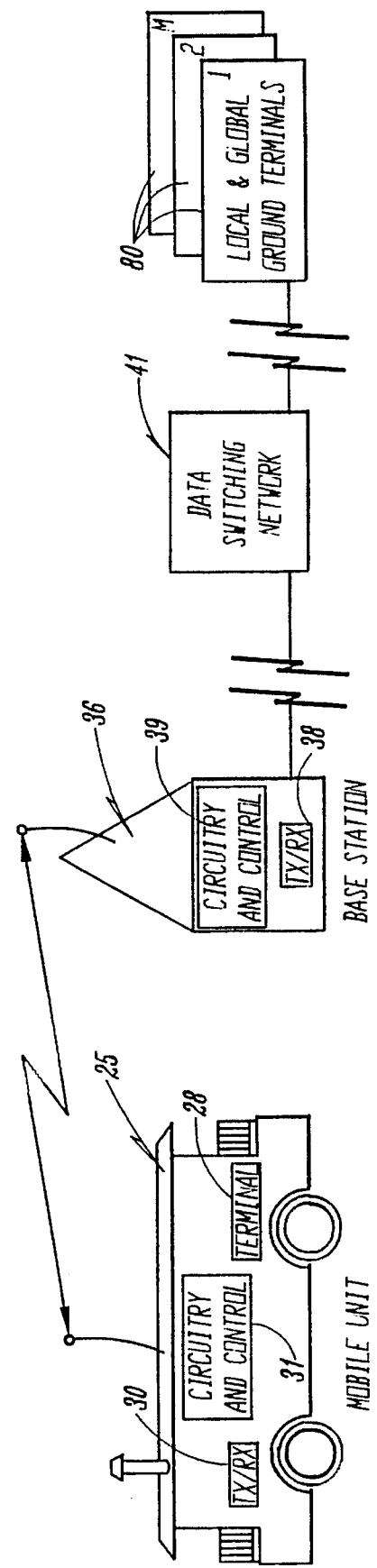
FIG. 2 is a diagram of radio frequency communication between a mobile unit, base station, and network control according to the preferred embodiment of the present invention.

FIG. 2 also diagrammatically depicts a mobile unit 25. Each mobile unit 25 has a transmitter/receiver function 30, one or more data terminals 28, and other circuitry and control logic 31, such as will be described later.

In the preferred embodiment, each mobile unit 25 is a locomotive or any railroad vehicle operating on the railroad property. Base stations 36 are distributed geographically around the geographic area 1. Railroad tracks (not shown) pass through at least some of the regions 4A–4G.

Radio frequency communication can therefore be held between mobile units 25 and the data switching network 41 by direct communication over radio waves between mobile unit 25 and one or more base stations 36, which in turn can then communicate to the network 41 and, ultimately, to terminals 80.

A mobile unit or train 25 may meander through any of these areas 4A–4G which may have different frequencies (designated as F1, F3, F4, F5) of operation assigned to some areas by the FCC.

b. Overview of Operation

A summary of how the system would operate is given below as an example. Suppose a mobile unit 25 is traveling from region 4A, covered by frequency F1, to a region 2 with no coverage, then to region 4E covered by frequency F4, and finally to region 4D covered by frequency F3.

As the mobile unit 25 departs from area 4A of frequency F1 coverage, the mobile unit 25 constantly monitors communication traffic and, when it detects a network beacon message from a base station 36, resets a timer. As mobile unit 25 leaves area 4A of frequency F1 coverage, it will no longer be able to detect beacon messages from the network base station 36 in region 4A. Therefore, the beacon timer, which is set to a length of time longer than the time interval in which network beacons would normally take place, will time out and the mobile unit will indicate to its onboard terminals 28 that it is now out of region 4A covered by frequency F1, and cease its transmission. Subsequently the data switching network 41 times the mobile's absence and determines that the mobile unit 25 is no longer in communication.

The mobile unit 25 which is now in a region 2 (uncovered by a network frequency) scans through a series of frequencies "listening" for communication activity at each frequency. The mobile unit 25 will tune to a frequency, monitor activity for a period which is greater than the minimum interval between base station 36 beacons for that mobile unit's network, and proceed to the next frequency listed in its table of frequencies; returning to the first frequency after it monitors the last frequency in the table. The mobile unit 25 detects data communications on a given frequency (F4 when it reaches region 4E for example). It terminates its scan routine, begins to count the number of transmissions it detects at that frequency, and checks each transmission to determine whether it is a network beacon transmission for the network of which it is a part.

If the transmission is confirmed as a network beacon and if the number of transmissions received at that frequency has met a threshold (five transmissions in the present embodiment), the mobile unit 25 then determines it is in an area of solid coverage and sends a salutation message to the network base station 36. The base station 36 for region 4E transmits a confirmation message in return. Upon receipt of this confirmation, the mobile unit 25 informs its onboard terminals 28 that the unit 25 is now in a region of coverage ("in-coverage") and the terminals 28 may send information to be transmitted or be prepared to receive information from the network.

Once a network is acquired in this manner in region 4E, the mobile unit 25 continues to transmit and receive using the same frequency F4. If the mobile unit 25 enters a region of overlapping coverage, (for example, overlap 6a of regions 4D and 4E in FIG. 1) the unit 25 can continue to operate on frequency F4 until it leaves region 4E and, as with the unit when it left region 4A, the mobile unit's beacon timer times out. When the beacon timer times out, the mobile unit 25 reverts to its scan mode and, since it is in region 4D, will detect a beacon signal at frequency F3 and proceed as above.

In actual operation, prior to a beacon timer time out and before reverting to a pure scan mode, the mobile monitors a secondary frequency for beacon transmission based on the determination that RF communications are failing. The primary and secondary frequencies are assigned and updated regularly by the network controller. This prioritized approach to beacon searching shortens, on average, the time required to locate a beacon signal in areas of overlapping coverage.

c. Specific Components of Preferred Embodiment

Figure 3:
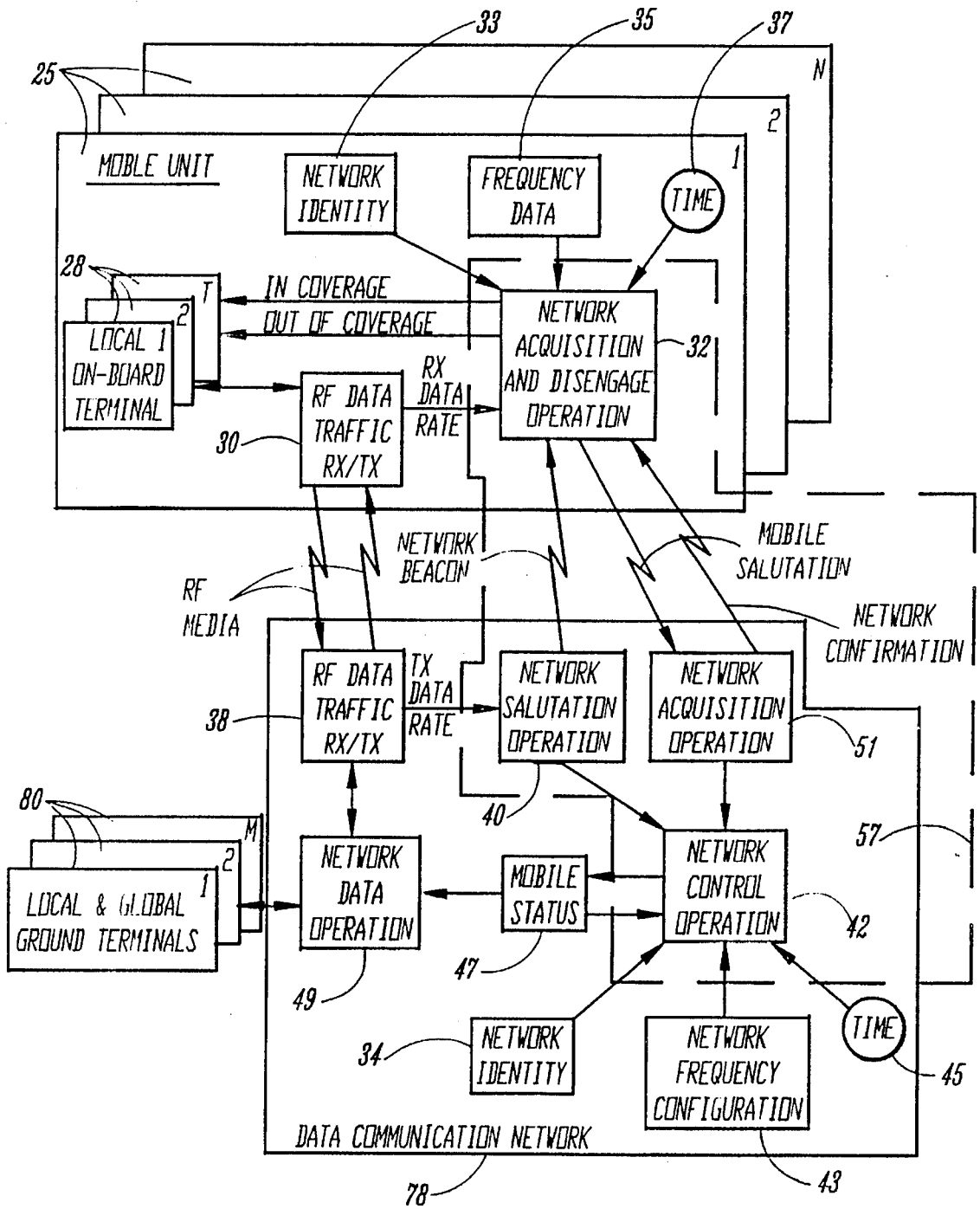
FIG. 3 is a functional block diagram of a preferred embodiment of a mobile RF communication system according to the present invention.

FIG. 3 is a functional block diagram illustrating the relationship between a plurality of mobile units 25 (numbered 1, 2, ... N) and the data communication network 78 which includes a plurality of base stations 36 and the data switching network 41. Each mobile unit 25 has a number of onboard terminals 28 (designated by 1, 2, ... T), a transceiver 30, and a network acquisition and disengage functional block 32.

The network acquisition and disengage operation block 32 includes access to network identity information 33, frequency data 35 and time 37 all of which are part of the mobile circuitry and control logic 31. The data could be stored in memory. They would respectively provide mobile unit 25 with an authorized listing of network identity matters and an authorized frequency table for the particular network involved. Time 37 for operation 32 would be provided by some type of clock.

FIG. 3 shows that transceiver function 30 communicates directly with onboard terminals 28. It also would provide operation 32 with received data rate information to allow mobile unit 25 to know what sort of data information load is occurring. Transceiver function 30 would basically be directly in communication with a transceiver function 38 associated with the network.

Operation 32 also, as shown in FIG. 3, provides "in-coverage" and "out of coverage" information to terminals 28. Essentially, operation 32 lets terminals 28 know when the network has been engaged (in-coverage) and when it is disengaged (out of coverage). This is done automatically and does not require manual supervision. Terminals 28 therefore are informed of the appropriate time for radio frequency communication between transceiver functions 30 and 38.

The data communication network 78 is composed of a number of network base stations 36 and a data switching network 41 which is associated with a number of ground terminals 80 (1, 2, ... M). The transceiver 38, network salutation 40, network acquisition 51 and network data 49 functional operations are part of the data communication network and distributed between the data switching network 41 and the base stations 36. Additionally, the data switching network houses network control operation 42. The present invention deals with the acquisition, disengage and salutation functions of blocks 32, 40, 51 and a subset of 42. FIG. 3 also shows that network control operation 42 is provided with information from a variety of sources. First, network identity information 34 (similar to that in block 33 of mobile units 25) is accessible from some sort of memory device. Network frequency configuration 43 contains the information regarding assigned frequencies for the various regions. A timer device 45 is also in communication with operation 42. Finally, a mobile status table can be read or altered by operation 42. Mobile status 47 basically allows the network to keep track of the status (for example location, direction, etc.) of the mobile units 25. Mobile status 47 in turn is communicated to data operation block 49 which is communicated with both ground terminals 80 and transceiver function 38. Mobile status 47 provides for the routing of messages to the appropriate RF base station.

It is also noted that transceiver function 38 sends a transmission data rate signal to network salutation operation block 40. As previously described the beacon from the base stations of the network is dynamically and independently adjusted for each base station according to the data traffic load in that region. The transmission data rate information therefore allows the periodic repeating of the beacon for the particular base stations to be accordingly adjusted.

FIG. 3 also illustrates the three types of communications between the network and mobile unit that occur regarding network salutation and acquisition.

The network beacon is broadcast until received by network acquisition and disengage operation 32 of mobile unit 25. Once reception is confirmed, mobile unit 25 generates a mobile salutation back to network acquisition operation 51. When verified, operation 51 returns a network confirmation or acknowledgment back to operation 32 of mobile unit 25. In this manner, both mobile unit and network verify and confirm network acquisition and engagement. This is important so that the mobile unit can reliably instruct terminals 28 to begin data communication. It is also important so that the network can update mobile status 47 to keep track of the mobile units 25.

It is particularly pointed out that dashed line 57 indicates the network acquisition mechanism according to the present invention. These functions can be accomplished with hardware and software components such as are well within the skill of those or ordinary skill in the art.

d. Network Salutation Operation

Figure 4:
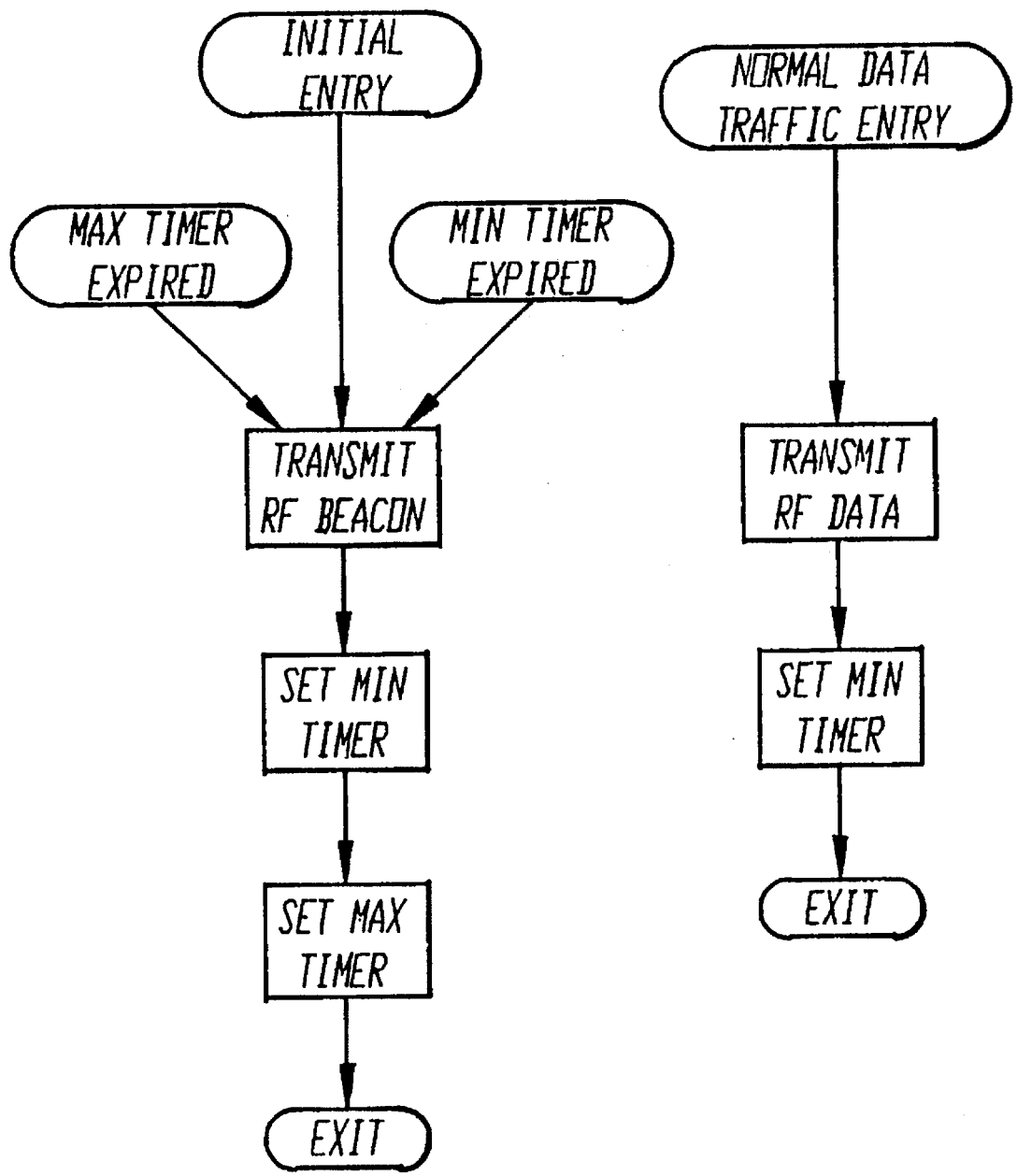
FIG. 4 is a flowchart of network salutation operation according to the preferred embodiment of the present invention.

FIG. 4 is a flowchart generally outlining the manner in which the network sends out its salutation beacons. For each base station, network salutation operation 40 periodically generates a network salutation beacon. The purpose of the beacon is to provide an RF data transmission which may be received by any mobile unit 25 operating in or just entering the areas 4A–4G of RF coverage. The periodic rate varies dynamically and independently at each base station 36 between a minimum periodic repeating rate and a maximum periodic repeating rate. The rate depends on the transmit data rate provided to network salutation operation 40 by transceiver function 38. This transmit data rate is correlated to the normal RF data traffic generated at the time by the specific system application.

By referring to FIG. 4, it can be seen that a minimum rate timer is set as a function of the normal data traffic entry. FIG. 4 also shows that both minimum and maximum rate timers are set by the system. Current values are 60 and 15 second intervals for minimum and maximum rates respectively.

If there is no normal RF data traffic for a duration of time equal to the time period set for the maximum repeating rate for the beacon, the network salutation beacon is transmitted. For long periods of time in which there is no normal data traffic at a base station 36, this results in the shortest time interval between network beacons (or in other words, the maximum repeating rate).

If on the other hand the normal RF data traffic is more frequent than the minimum periodic repeating rate, the network beacon is transmitted at the minimum rate (that is the longest time period between repeating beacons). This variable rate procedure ensures a timely capture of the network by the mobile units 25, but also purposefully reduces the RF load requirement of the beacon during times of high natural data traffic.

e. Mobile Unit Engagement of Network

Figure 5:
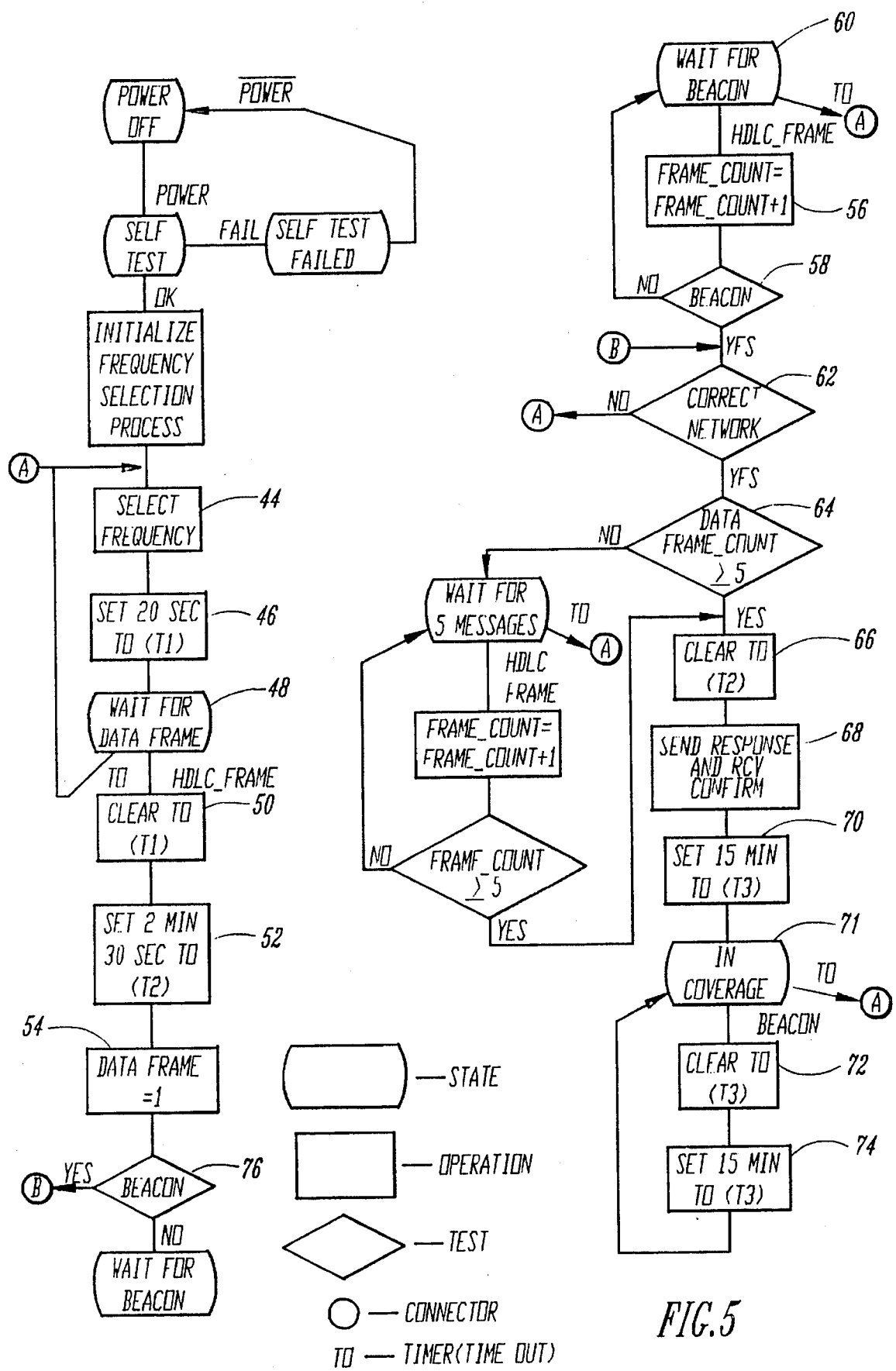
FIG. 5 is a flowchart of the network coverage determination of the preferred embodiment.

The flowchart of FIG. 5 illustrates the sequence a mobile unit follows in acquiring, communicating with and disengaging from a network. After successfully passing its self test, the mobile unit selects a frequency to monitor (block 44), and sets a 20 second time-out (block 46). If a data frame is not received within the 20 second time-out period, the mobile unit selects another frequency to monitor as before. If, on the other hand, a data frame has been received, the mobile unit clears the 20 second time-out (block 50), sets a 2 minute and 30 second time-out (block 52), and sets the frame count to one (block 54). If the received frame was not a beacon, each subsequent frame increments the frame count (block 56) and each frame is checked to see if it is a beacon (block 58). If the timer expires before a beacon is received, the scanning process is renewed (block 60). When a beacon is received, it is examined to determine whether it is from the desired network (block 62), if not, the scan is renewed. If it is the proper network beacon and the unit has received at least five frames on the present frequency within the period of 2½ minutes (block 64), the mobile unit clears the timer (block 66), sends a salutation to the base station (block 68), and sets a 15 minute timer. Upon the receipt of each subsequent beacon message, the mobile unit resets the timer (blocks 72 and 74), and until the timer expires, the mobile unit considers itself to be in coverage.

In the railroad application of the preferred embodiment, the mobile unit would be onboard a train. When a train starts after a layover, it begins to scan frequencies (blocks 44 through 48). As soon as the train detects data communication in the form of an HDLC frame the mobile unit checks the frame to determine if it is a beacon (block 76), and whether, in addition, it has received more than five frames at this frequency (block 64). By requiring the receipt of five frames, the mobile unit assures itself that it is in an area of solid coverage, not just intermittent coverage. The mobile unit also examines a beacon once it receives one to determine the network the beacon is servicing.

Each network is generally associated with a particular railroad. The mobile unit searches for a predetermined duration (2½ minutes in the present embodiment) for a beacon and four additional data frames. If time expires, the unit proceeds to monitor another frequency (block 44), until it has found a proper beacon and four additional frames within the 2½ minute time period. Once the beacon and frame count requirements have been met, the mobile unit on board the train sends a salutation message (block 68), to the network base station. The network base station responds with a confirmation, sets its beacon interval to a longer interval (15 minutes presently) (block 70), and informs the network controller that the mobile unit is within coverage (block 71). The mobile unit clears the timer (block 72) and resets it to a longer interval (15 minutes presently) which it uses to determine when it has gone out of coverage (block 74). After the longer interval transpires with no activity at the previous frequency, the mobile unit declares itself out of coverage and alerts the train's onboard terminals. After a longer period of time, the network declares the mobile unit out of coverage.

In this way, mobile units automatically acquire and disengage from a multifrequency RF data networks throughout a large geographic area.

The network control operation performed within the data communication network can also receive the identity of the mobile unit entering an area of RF coverage and update the mobile status data utilized for normal RF traffic data by the network data operation. The mobile identity is removed from the mobile status data table after a period of time of no RF activity by that mobile unit. That period of time used by the network is much longer than the time period used by the mobile unit to declare out of coverage to the onboard terminal.

Figure 6:
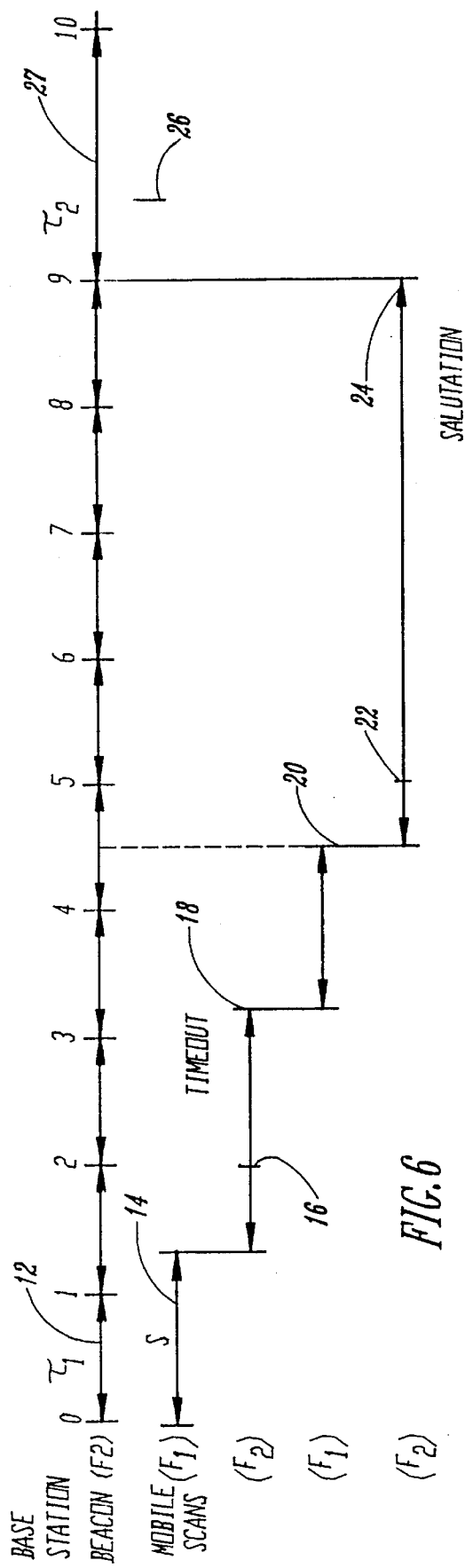
FIG. 6 is a timing diagram that illustrates network acquisition and termination operation according to a referred embodiment of the invention.

FIG. 6 illustrates a simplified example of the timing relationships between the network base station beacon, mobile unit's scan period for a given frequency, the mobile unit's time-out period, the mobile unit's salutation, and the base station confirmation signal.

The base station transmits a beacon at time interval $t_1$, (see reference numeral 12). The mobile unit monitors a frequency (for example F1) from its frequency table for a period of time s (reference numeral 14), which is greater than the minimum interval $t_1$ between salutation beacons. If the mobile unit does not detect data communications at the frequency F1 during a period s, the mobile unit tunes to the next frequency in its frequency table (F2 in the illustration). At point 16 in FIG. 6, the mobile unit detects the network beacon operating at frequency F2 and continues to monitor frequency F2, but, at point 18, the mobile unit has not received another beacon during the prescribed beacon time interval and consequently the mobile unit tunes to the next frequency, $f_1$, and begins to monitor that frequency. The lapse of the network beacon and consequent time-out at point 18 is meant to illustrate the case when a mobile unit is just coming into the coverage area and receives beacons only intermittently. After monitoring frequency F1 again until a time-out point 20, the mobile unit repeats its frequency scan and tunes to frequency F2.

Upon receipt of a network beacon (point 22) the mobile unit remains tuned to frequency F2 and counts the number of network beacons it has received. After it has received five beacons, it is therefore well assured of being in an area of solid coverage, the mobile unit transmits a salutation signal (see point 24).

In response to the mobile unit's salutation signal, the base station transmits a network confirmation signal (point 26), and sets the time interval between beacons to a longer time period $t_2$, 27, in order to permit transmission of a greater number of data packets within a given time period.

Figure 7:
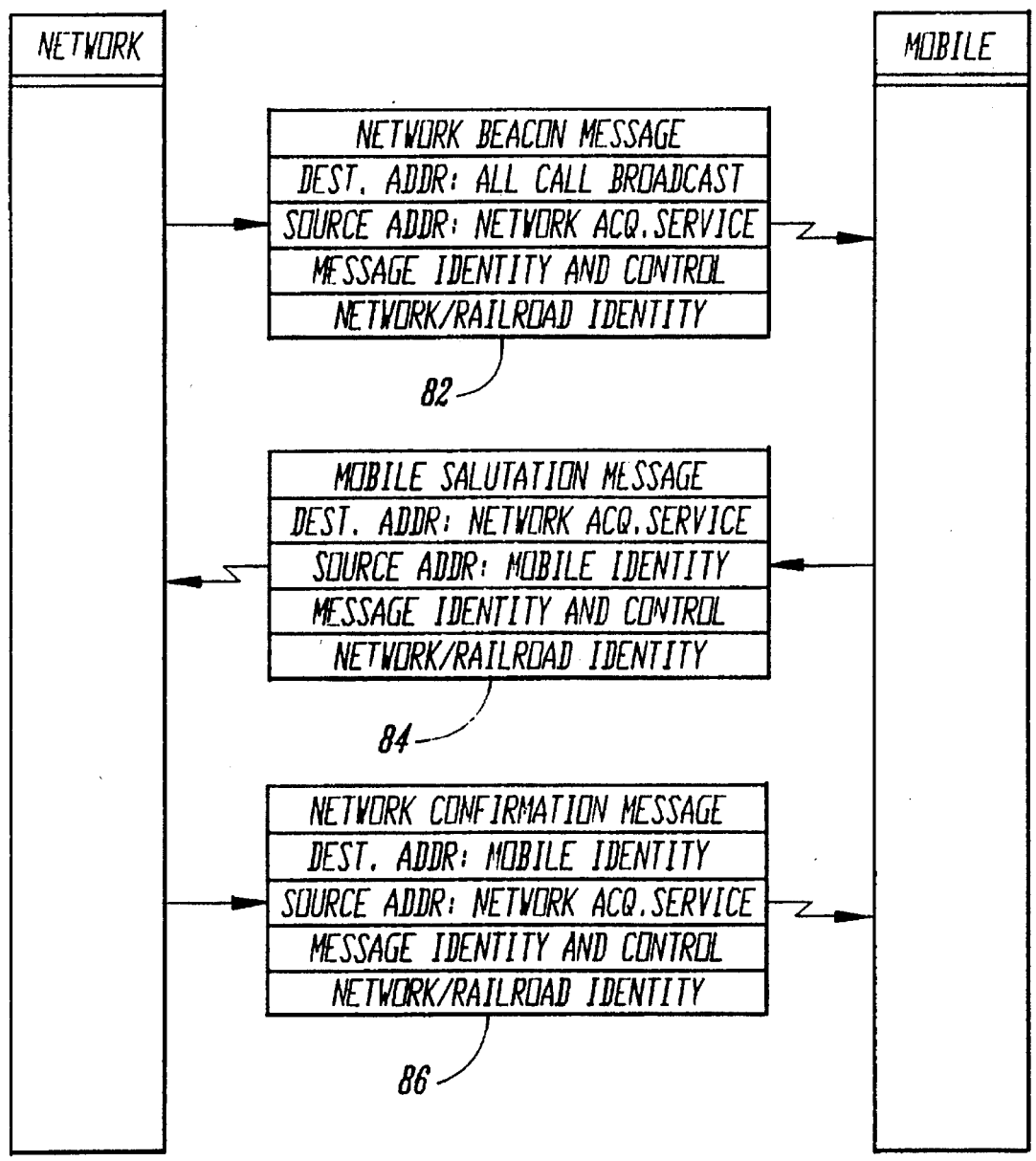
FIG. 7 is a representative example of the format of information communicated between a mobile unit and base station according to the preferred embodiment of the present invention.

FIG. 7 depicts one possible format for the information communicated regarding salutation and acquisition. The beacon message will be sent out as an "all call" through each base station 39. This is done to establish contact with mobile units 25 that may be in the range of the base station 39, but not in coverage.

The format of the beacon message is defined in FIG. 7, block 82, which represents the format for information in the beacon signal from base station to mobile unit. FIG. 7, block 84 reveals the information format for the response to receiving beacon as sent from the mobile unit to the base station. Finally, FIG. 7, block 86 shows the format for an acknowledgment of the response as sent from the base station back to the mobile unit.

As can be seen in FIG. 7, the beacon salutation and confirmation messages transferred between the network and a mobile unit comprise four basic data fields; destination address, source address, message identity and control, and network/railroad identity.

In a beacon message, 82, the destination is "all call"; that is, the beacon is directed to any mobile unit which may be in range of the transmission. The beacon source is the network acquisition service. The beacon's message identity and control data field includes information which indicates that the message is a beacon message, and the network/railroad identity field reveals the network or railroad associated with the beacon.

As previously described, the mobile unit transmits a salutation message, 84, in response to the reception of a network beacon message. The mobile unit sends the salutation message to the network acquisition service—the network acquisition service therefore occupies the destination field of the salutation message. Each mobile unit has a unique identifier associated with it and this identifier occupies the salutation field's source address. The salutation message's message identity and control field contains information indicating that this is a salutation message—allowing the network acquisition service to prepare an appropriate response for the mobile unit. The mobile unit's network/railroad identity data field indicates to the network acquisition service the identity of the network or railroad associated with the mobile unit.

The network confirmation message, 86, is the final step of the network acquisition handshaking process. After the network acquisition service receives and processes a salutation message, it sends a confirmation message to the mobile unit which transmitted the salutation message. The destination field of the confirmation message is occupied therefore, by the mobile identity which was the source address of the mobile salutation message. The source address is, of course, the network acquisition service and the message identity and control field indicates that the message is a network confirmation message. The network/railroad identity indicates, once again, the identity of the associated network or railroad.

It will be appreciated that the present invention can take many forms and embodiments. The true essence and spirit of this invention are defined in the appended claims, and it is not intended that the embodiment of the invention presented herein should limit the scope thereof.

For example, specific implementation and configuration of the system can take many forms and embodiments. Much of the control can be put in software.

We claim:

1. A system for RF communication network acquisition for RF communication between one or more mobile units and a plurality of base stations of a network having a plurality of RF broadcast regions distributed over a geographic area comprising:

means for issuing an RF beacon of selected frequency, beacon messages and data content from the base stations;

means at base stations for adjusting periodic rate of issuance of the RF beacon according to data traffic at the base stations;

means on the mobile units for scanning a list of frequencies;

means on the mobile units for discerning if an RF beacon at a frequency from the list has been received; and means on the mobile units for discerning if a beacon is of sufficient quality to carry on RF communication with the network;

wherein the means for discerning if the beacon is of sufficient quality includes timing means for determining if a threshold level of a number of beacon messages is received over a given time period;

means for continuing scanning the list of frequencies if the timer means determines the threshold level of number of beacon messages was not received within the given time period.

2. A system for RF communication network acquisition for RF communication between one or more mobile units and a plurality of base stations of a network having a plurality of RF broadcast regions distributed over a geographic area comprising:

means for issuing an RF beacon of selected frequency, beacon messages and data content from the base stations;

means at base'stations for adjusting periodic rate of issuance of the RF beacon according to data traffic at the base stations;

means on the mobile units for scanning a list of frequencies;

means on the mobile units for discerning if an RF beacon at a frequency from the list has been received; and means on the mobile units for discerning if a beacon is of sufficient quality to carry on RF communication with the network;

a means on the mobile unit for discerning if the RF beacon is no longer of sufficient quality to carry on RF communication;

wherein the means for discerning if the RF beacon is no longer of sufficient reliability includes a timer means for determining if receipt of RF beacons has stopped within a certain time period;

means on the mobile unit for reinstating a network acquisition process, when the timer means determines that receipt of beacons has stopped.

* * * * *